United States Patent
Liu et al.

(10) Patent No.: US 11,601,382 B2
(45) Date of Patent: Mar. 7, 2023

(54) ASYMMETRIC NETWORK INFRASTRUCTURE WITH DISTRIBUTED BROADCAST-SELECT SWITCH AND ASYMMETRIC NETWORK INTERFACE CONTROLLER

(71) Applicant: Viscore Technologies Inc., Nepean (CA)

(72) Inventors: Yunqu Liu, Ottawa (CA); Zhilong Li, Stittsville (CA)

(73) Assignee: Viscore Technologies Inc., Nepean (CA)

( * ) Notice: Subject to any disclaimer, the term of this patent is extended or adjusted under 35 U.S.C. 154(b) by 0 days.

(21) Appl. No.: 17/360,046

(22) Filed: Jun. 28, 2021

(65) Prior Publication Data

US 2021/0409348 A1 Dec. 30, 2021

Related U.S. Application Data

(60) Provisional application No. 62/705,485, filed on Jun. 30, 2020.

(51) Int. Cl.
| | |
|---|---|
| *H04L 12/933* | (2013.01) |
| *H04L 12/947* | (2013.01) |
| *H04L 49/101* | (2022.01) |
| *H04L 49/1515* | (2022.01) |
| *H04L 49/90* | (2022.01) |
| *H04L 49/25* | (2022.01) |

(52) U.S. Cl.
CPC ........ *H04L 49/101* (2013.01); *H04L 49/1523* (2013.01); *H04L 49/25* (2013.01); *H04L 49/9068* (2013.01)

(58) Field of Classification Search
CPC ... H04L 49/101; H04L 49/1523; H04L 49/25; H04L 49/9068
USPC ........................................................ 370/392
See application file for complete search history.

(56) References Cited

U.S. PATENT DOCUMENTS

| | | | |
|---|---|---|---|
| 2002/0107903 A1* | 8/2002 | Richter | ................... H04L 43/00 709/251 |
| 2003/0063605 A1 | 4/2003 | Ravi et al. | |
| 2004/0085979 A1* | 5/2004 | Lee | ........................ H04L 49/101 370/413 |
| 2008/0212472 A1 | 9/2008 | Musacchio et al. | |
| 2008/0247411 A1 | 10/2008 | Abel et al. | |
| 2014/0269302 A1* | 9/2014 | Morandin | ............... H04L 47/27 370/235 |

FOREIGN PATENT DOCUMENTS

KR 20140125311 A * 4/2014

OTHER PUBLICATIONS

Leong, K., Li, Z., & Liu, Y. (2019). Reliable multicast using the remote direct memory access (RDMA) over a passive optical cross-connect fabric enhanced with wavelength division multiplexing (WDM). APSIPA Transactions on Signal and Information Processing, 8, E25. 10.1017/ATSIP.2019.17.

(Continued)

*Primary Examiner* — Faisal Choudhury
(74) *Attorney, Agent, or Firm* — Stratford Group Ltd.

(57) ABSTRACT

Network infrastructure systems including asymmetric Distributed Broadcast Select Switches and Asymmetric Network Interface Controllers for implementation in asymmetric networks and more particularly in cluster networks are provided.

10 Claims, 11 Drawing Sheets

(56) References Cited

OTHER PUBLICATIONS

L. M. Ni and P. K. McKinley, "A survey of wormhole routing techniques in direct interconnection networks," in Computer, vol. 26, No. 2, pp. 62-76, Feb. 1993.
A. Misawa et al., "A prototype broadcast-and-select photonic ATM switch with a WDM output buffer," in Journal of Lightwave Technology, vol. 16, No. 12, pp. 2202-2211, Dec. 1998.
Lisong Xu, H. G. Perros and G. Rouskas, "Techniques for optical packet switching and optical burst switching," in IEEE Communications Magazine, vol. 39, No. 1, pp. 136-142, Jan. 2001.
Hamad, A.M., & Kamal, A.E. (2002). A survey of multicasting protocols for broadcast-and-select single-hop networks.
International Search Report for PCT/CA2021//050885 dated Sep. 20, 2021, 3 pages.

\* cited by examiner

ASYMMETRIC NETWORK INFRASTRUCTURE WITH DISTRIBUTED BROADCAST-SELECT SWITCH AND ASYMMETRIC NETWORK INTERFACE CONTROLLER

CROSS REFERENCE TO RELATED APPLICATIONS

This application claims the benefit of U.S. Provisional Application No. 62/705,485, filed Jun. 30, 2020 which is hereby incorporated by reference herein in its entirety.

FIELD OF THE INVENTION

The present disclosure relates to network infrastructure, and particularly to cluster network architecture including network switches and network interface controllers, their configuration and interconnection.

BRIEF SUMMARY

According to a first aspect, there is provided a system for a communication infrastructure in a network, the system comprising: an asymmetric crossbar switch including a crossbar switch fabric having N ingress ports and M egress ports, and N×M cross-points, each egress and ingress port having the same capacity, N being less than M, and the asymmetric crossbar switch configured to controllably switch to any egress port a signal arriving at any one ingress port; and at least one select receiver, each select receiver coupled to K egress ports of the M egress ports.

In some embodiments, the asymmetric crossbar switch is comprised in a distributed broadcast select switch (DBSS) controlling the asymmetric crossbar switch to switch signals received over the ingress ports to the egress ports with use of packet addresses in said signals.

In some embodiments, the N ingress ports of the DBSS are coupled to N transmitters and N×K of the M egress ports of the DBSS are coupled to the at least one select receiver, the at least one select receiver consisting of N select receivers, K being less than N, and M greater than or equal to N×K.

In some embodiments, each select receiver is comprised in a corresponding asymmetric network interface controller (ANIC) comprising K input ports and at least one output port, the number of output ports less than K.

In some embodiments, each ANIC comprises a selection and buffer logic for buffering and selecting packets received by the corresponding select receiver, wherein each select receiver includes K receivers each including one of said K input ports.

In some embodiments M is equal to N×K.

In some embodiments, the network comprises a Clos network, wherein M is equal to (N/2)×(K+1), wherein the DBSS is implemented as a last stage top of rack switch of the Clos network.

In some embodiments, a first N/2 of the N ingress ports are coupled to an adjacent level of the Clos network to the DBSS, a second N/2 of the N ingress ports are coupled to a previous hop DBSS, and N egress ports of the DBSS are coupled to a next hop DBSS.

In some embodiments, the network comprises a cluster network. In some embodiments, the cluster network is a direct interconnection cluster network.

According to another aspect, there is provided a system for a communication infrastructure in a network, the system comprising: an asymmetric network interface controller (ANIC) comprising at least one transmitter and a select receiver including K receivers, each receiver having an input port and each transmitter having an output port, each input and output port having the same capacity, the number of transmitters less than K.

In some embodiments, the ANIC comprises a selection and buffer logic for buffering and selecting packets received by the K receivers of the select receiver.

In some embodiments, the input ports of the ANIC are coupled to K egress ports of an asymmetric crossbar switch.

In some embodiments, the ANIC is comprised in a compute node of a cluster network.

In some embodiments, the ANIC is comprised in storage equipment of a datacenter network.

According to another aspect, there is provided a system for a communication infrastructure in a network, the system comprising: an asymmetric crossbar switch comprising a crossbar switch fabric having N ingress ports and M egress ports, and N×M cross-points, each egress and ingress port having the same capacity, N not equal to M, and the asymmetric crossbar switch configured to controllably switch to any egress port a signal arriving at any one ingress port. In some embodiments N is less than M.

In some embodiments, the N ingress ports of the DBSS are coupled to N transmitters and N×K of the M egress ports of the DBSS are coupled N select receivers, each select receiver coupled to K egress ports, K being less than N, and M greater than or equal to N×K.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

Contemporary networks are popularly built with symmetric switch fabric and network ports that have the same transmitting and receiving capability. Symmetric networks with the same transmitting and receiving capacity are popularly deployed in Telecom networks, Data centers, High-Performance Computing, and various kinds of clusters. While symmetric network design fits some networks in which the major workload is peer-to-peer even, e.g. telephone, such a configuration is often not well suited for communication traffic of a cluster network, in which multicast and incast are prevalent.

Asymmetric networks with more receiving capacity than transmitting capacity have been proposed quite early in the form of shared media Ethernet, and have been deployed for home access networks, e.g. GPON, GEPON etc.

In the middle of the 1990s, after the optical fibre network became available, optical-based networks were intensively studied, and optical broadcast-select networks were also discussed, including designs with WDM in which they are visibly asymmetric for multiple wavelengths receivers. While the optical WDM enhanced architecture has many advantages, many of them are fixed cross-connection based. The optical switch-based architectures are slow for the lack of fast optical switch components, and more importantly, these architectures cannot be seamlessly integrated into silicon switch chips.

The Broadcast Select Switch (B&S) has been studied for some time, and is currently well-known technology. When optical fibre communication became available, researchers found the B&S switch an interesting architecture again and proposed many new optical fibre-based architectures. The study of optical B&S switches shows the remarkable performance gain of multicast. However, these new optical architectures ask the owners to build an additional optical infrastructure with independent optical switches or cross-connections. The challenge and inconvenience of that proposal is not only extra financial construction and maintenance costs, but also the limited performance and flexibility of currently available optical switches.

Multicast and incast traffic patterns are long-standing challenges in the design and management of cluster networks. In cluster networks, each storage and/or computing node communicates with more than one peer to collaborate, which introduces multicast. Within a network based so heavily on multicast, the occurrence of incast is practically guaranteed. Furthermore, even in networks whose network traffic is only unicast, it needs to be perfectly balanced to reduce random instances of incast. However, in the transit between equivalent balanced network configurations, burst incast still occurs. In the traffic patterns of cluster networks, multicast and incast are essential. It should be understood that other kinds of networks including those which are not cluster networks exhibit multicast and incast traffic patterns.

With multicast and incast traffic, the demands on the receiving capacity of network interface controllers is consistently higher than the demands on transmitting capacity. The cluster network should be constructed with asymmetric elements, namely with network interface controllers which have a greater receiving capacity than transmitting capacity, and often in combination with switches having greater egress capacity than ingress capacity. Combinations of asymmetric switches and asymmetric network interface controllers form asymmetric network infrastructure which advantageously addresses the asymmetric nature of the demands created by multicast and incast traffic patterns.

Techniques for developing reliable multicast have been proposed, for example, the popular Gossip protocol implementation is an overlay on top of unicast, but that introduces high latency and a heavy burden to the switch fabric. Another recent proposal, one by the inventors listed in connection with the present disclosure, for a reliable multicast over Optical Distributed Broadcast-Select Switch (ODBSS), is notably asymmetric for the transceivers and switch fabric. While it introduces a scalable, reliable, and arbitrary multicast service with low-latency, it demands an $N \times (N^{\wedge 2})$ switch fabric and N receiving bandwidth for each receiving port. That can only be implemented with DWDM optical with a relatively small subnet, e.g. 40-400 ports.

As mentioned above, the asymmetric network is much more appropriate for cluster networks for its multiple peers' collaboration communication pattern. Direct interconnection networks or direct connection networks, e.g. Torus, Hypercube and Meshes, used to be the major architecture for cluster networks before the rise of the VLSI (Very-large-scale integration) based switch, but even today, direct interconnection networks are still used in many cluster networks. Since their transceivers are physically symmetric, it is easy to ignore that they often work in asymmetric modes in that transmitters often use less of their capacity while the receivers often are fully loaded.

Disclosed herein are Distributed Broadcast Select Switches (DBSSs) and Asymmetric Network Interface Controllers (ANICs), which are not optically coupled, for implementing generic asymmetric cluster networks to solve the aforementioned currently open problems of multicast and incast traffic patterns as well as the costs and other drawbacks of optical WDM and B&S architectures mentioned above. Also disclosed are example embodiments of asymmetric networks constructed with those interface controllers and switches, including combinations with popular network topologies: Multi-stage networks (e.g. FatTree) and Direct Interconnection Networks (e.g. Torus and Hypercube). Such combinations are believed to improve peak bandwidth and locality and to lower latency and power consumption Distributed Broadcast Select Switch (DBSS)

Figure 1:
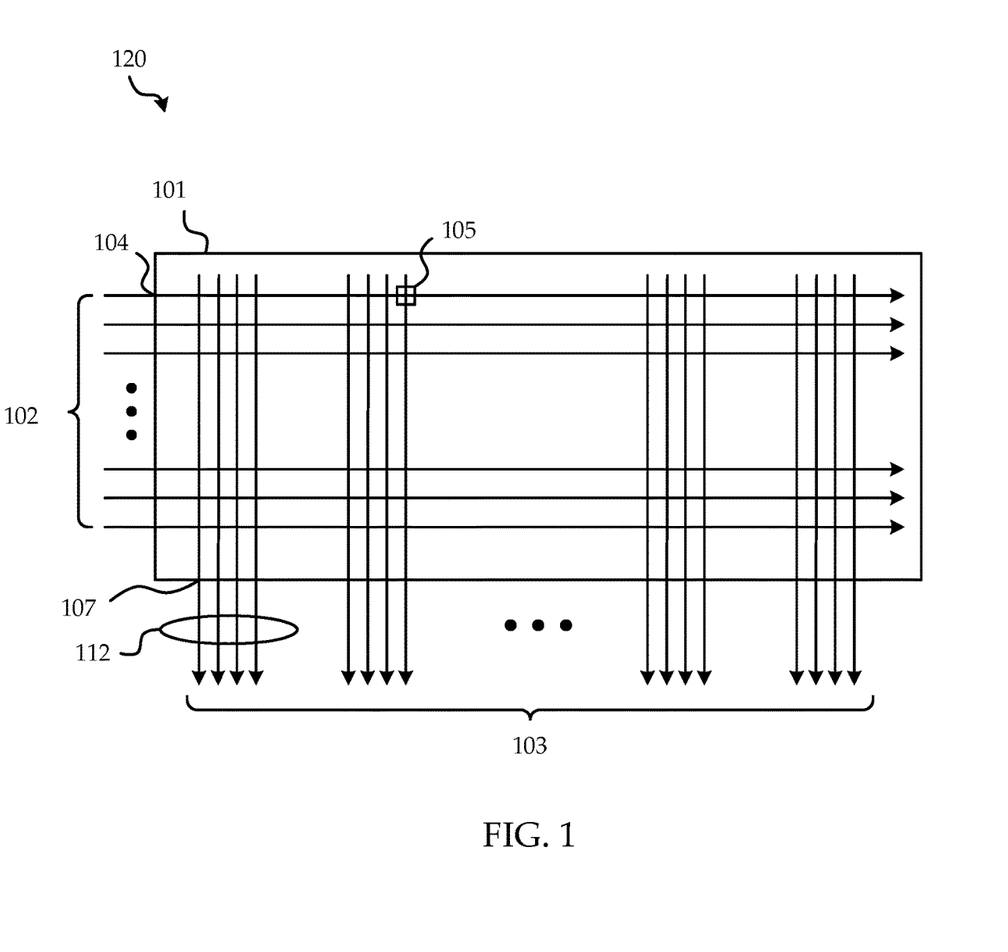
FIG. 1 is a schematic block diagram of a Distributed Broadcast Select Switch (DBSS) including an asymmetric crossbar switch according to an embodiment.

With reference to FIG. 1, a Distributed Broadcast Select Switch (DBSS) 120 that is not coupled with optical switches nor optical cross-connections, will now be discussed.

Figure 11:
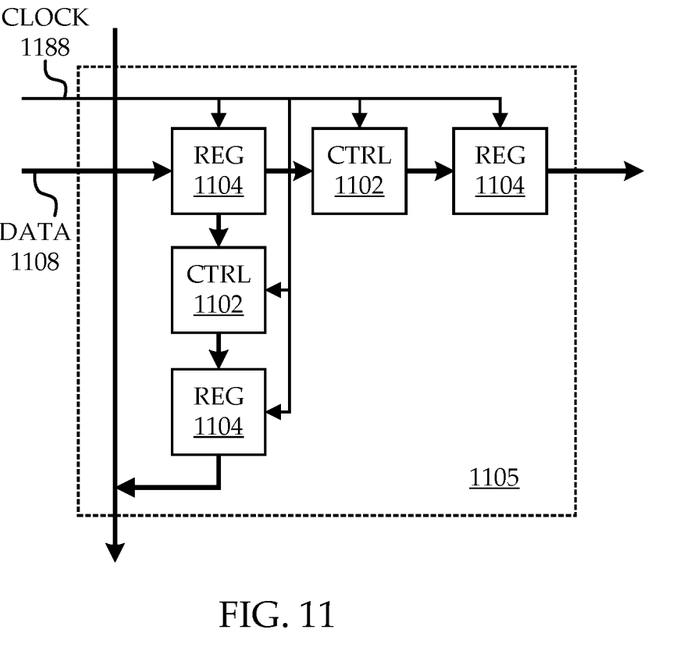
FIG. 11 is a schematic block diagram illustrating a cross-point circuit of a crossbar switch according to an embodiment.

The DBSS 120, primarily is comprised of an asymmetric crossbar switch 101 having ingress ports or inputs 104 for receiving ingress or input signals 102 and egress ports or outputs 107 for transmitting egress or output signals 103. The DBSS 120 includes a switching fabric with cross-points 105 for switching ingress signals 102 to the output ports 107. The cross-points 105 of the switching fabric of the crossbar switch 101 may be implemented with any structure capable of forwarding data toward the next egress lines and toward the egress ports such as the cross-point 105. With reference also to FIG. 11, a cross point 1105 (corresponding to cross-point 105 of FIG. 1) will now be discussed. Data packets 1108 are shifted through registers 1104, first in both directions, however, control 1102 determines whether the packet continues in either directions or both, i.e. shifted toward the egress port (downward in FIG. 11) and/or shifted to continue to the next egress line in the crossbar switch 101. In FIG. 11 there is independent control of whether the data packet is to be forwarded in either direction, however in some embodiments the packet is automatically copied to the next egress line and only whether the packet is to continue to be shifted toward the egress port is controlled. Clock signal 1188 is provided to each shift register 1104 and control 1102 circuit. Although not shown, the asymmetric crossbar switch 101 is controlled by a controller of the DBSS 120 which uses packet addressing, for example, MAC addresses, to configure which of the inputs 104, is switched to which of the outputs 107 for incoming packets. As such, control circuits 1102 are ultimately controlled by a controller of the DBSS 120.

The asymmetric crossbar switch 101 and the DBSS 120 are asymmetric, specifically, the number of outputs 107 exceeds the number of inputs 104. Each input 104 and output 107 has the same network traffic capacity and hence, since each output 107 at any one time is switched from one of the inputs 104, each input 104 may be switched to one or more of the outputs 107 at any one time. It is also noted that the inputs 104 and outputs 107 are generic and data agnostic, i.e. any of the inputs 104 may be switched to any of the outputs 107. This is to be distinguished from typical known crossbar switches which are either symmetrical, having the exact same number of inputs and outputs, or are arranged to switch signals of different types and having special functions to corresponding preset lines and outputs.

In one embodiment, N transmitters (not shown) connected to the DBSS's 120 N inputs 102 have a corresponding N select receivers (not shown) connected to the DBSS's 120 N×K outputs 107, each of the N select receivers having K (K<<N) receiving ports for receiving K output connections 112 each. FIG. 1 has K output connections 112 shown in a group from the outputs 107 of the crossbar switch 101. Each group of K output connections 112, in this embodiment are destined for one asymmetric network interface controller (ANIC) housing a single select receiver described further below.

Each output 103 of the crossbar switch is connected to one of N incoming connections 102. The crossbar switch has N×(N×K) (i.e. $N^2K$) cross-points 105. This is K times higher than a typical cross-bar which has N×N (i.e. $N^2$) cross points, but still, much less than N×(N×N) (i.e. $N^3$) proposed by the authors in an ODBSS. Although the DBSS 120 cannot achieve arbitrary lossless multicast, the dynamic functioning of a silicon asymmetric crossbar switch 101 introduces other features the static optical cross-connection lacks.

In some embodiments, the number of outputs 107 is not related to the number of inputs 104 according to the formulas noted above. In some embodiments, the number of select receivers does not equal the number of inputs 104. In other embodiments, the number of outputs 107 does not equal an integer multiple of the inputs 104. In some embodiments, with N inputs, only a subset of the outputs of each group of N groups of outputs are connected to the same ANIC.

In some embodiments, the number of outputs 107 is greater than the number of inputs 104. In some embodiments, the number of inputs 104 is not equal to the number of outputs 107 and in some embodiments, is greater than the number of outputs 107.

Asymmetric Network Interface Controller (ANIC)

In the embodiments of the DBSS 120 discussed above in which multiple (K) output signals 112 are destined for the same ANIC, a select function is delayed into the network interface controllers, in contrast to a standard Broad-Select Switch (B&S) for which no selection is made in the network interface controller.

Figure 2:
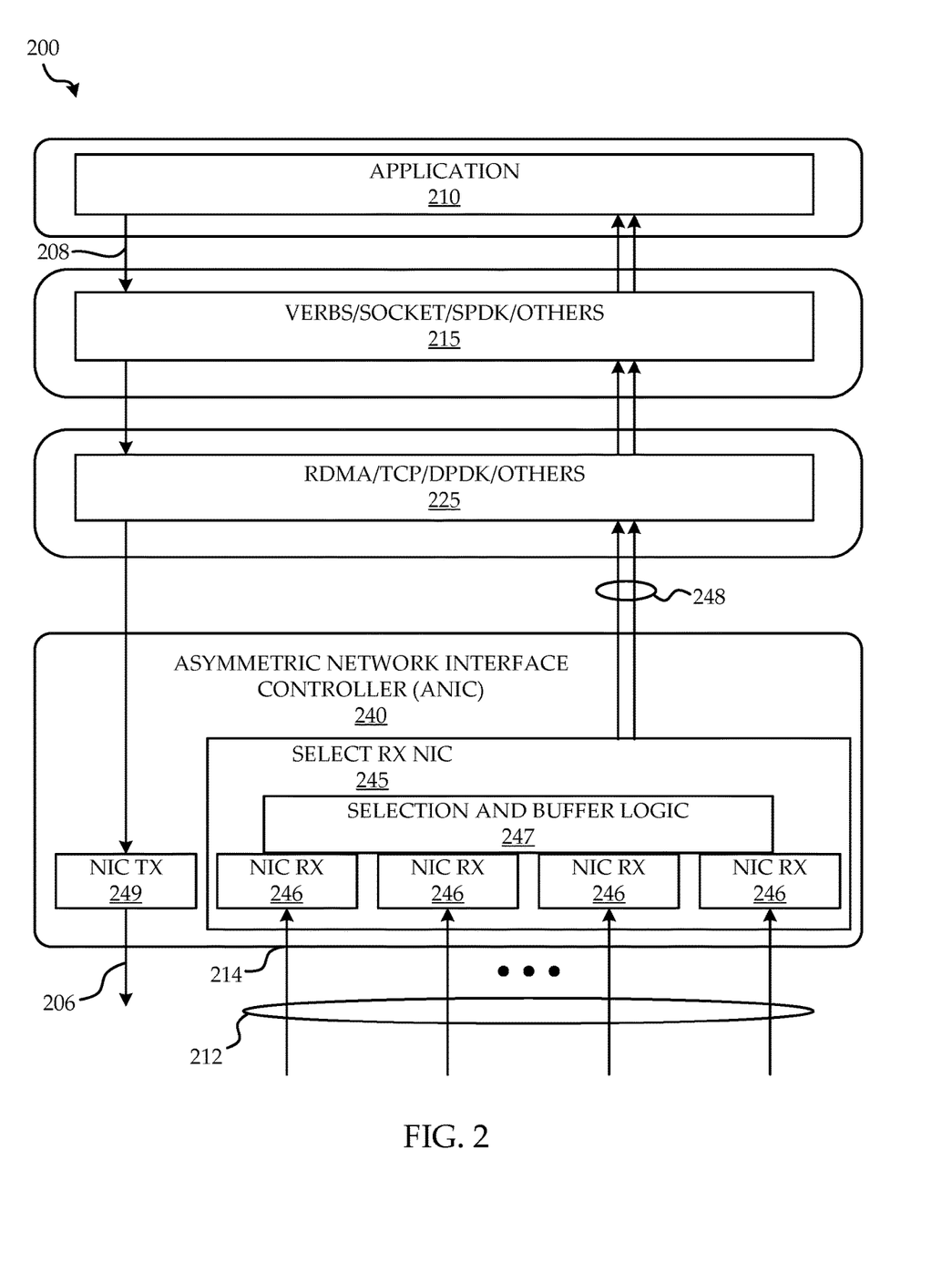
FIG. 2 illustrates an Asymmetric Network Interface Controller (ANIC) in a communications model for a generic asymmetric cluster network according to an embodiment.

With reference to FIG. 2, an asymmetric network interface controller (ANIC) 240 according to an embodiment, as it functions within the communications model 200 for an asymmetric cluster network will now be discussed.

Figure 12:
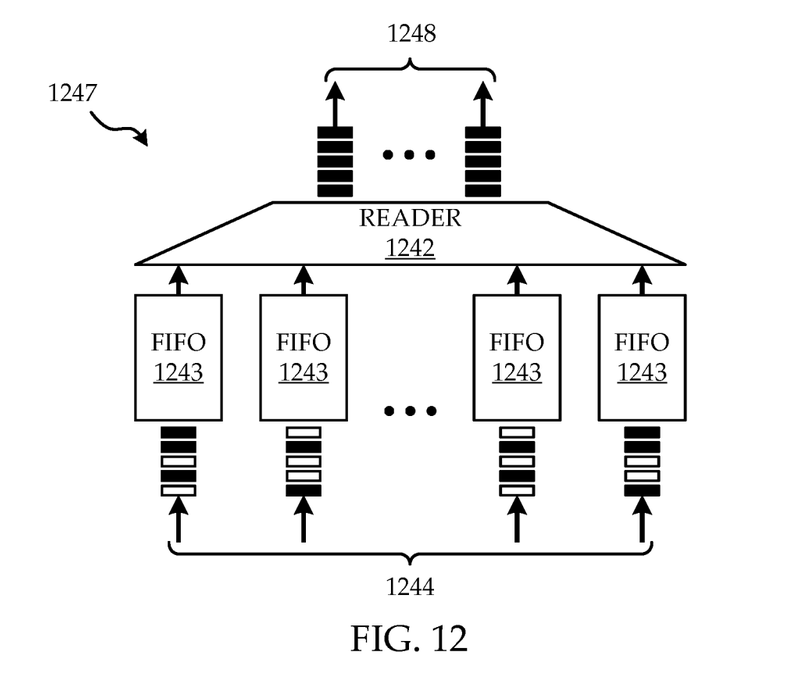
FIG. 12 is a schematic block diagram illustrating selection and buffer logic according to an embodiment.

In the ANIC 240, the transmitter 249 has one transmitting port outputting an output connection 206 and the select receiver 245 has K receivers 246 for receiving K input connections 212 over K input ports 214, one input port 214 for each receiver 246, hence the network interface controller is asymmetric. The selection and buffer logic 247 chooses the packet that is addressed into this ANIC 240, and drops all non-related ones. Since the asymmetric architecture is receive oriented, the selection and buffer logic 247 of the select receiver 245 has the prerogative to drop and select packets according to whatever condition, criteria, or high-level logic (e.g. data/application L4-L7) are implemented for its decision to drop and select packets. The selection and buffer logic may be implemented in hardware, software, firmware, or any combination thereof. With reference also to FIG. 12, in one embodiment, selection and buffer logic 1247 (corresponding to selection and buffer logic 247 of FIG. 2) includes K FIFO buffers 1243, one for each of the incoming signals 212 of FIG. 2, which are passed to the K FIFO buffers 1243 from the K receivers 246 of FIG. 2 as K incoming signals 1244. A reader circuit 1242 reads the data into K/2 data streams 1248.

The packets are then forwarded up the protocol stack (e.g. RDMA/TCP/DPDK/OTHERS 225, VERBS/SOCKET/SPDK/OTHERS 215) to the application 210. The application 210 may send data packets 208 for transmission back through the protocol layer stack 215 225 for transmission by the transmitter 249 in the ANIC 240. The packet streams 248 emerging from the selection and buffer logic 247 of the select receiver 245 need not equal K/2 data streams 1248 as shown in the example of FIG. 12, but may in fact have any capacity less than or equal to the incoming K signals 212 and as such the packet streams 248 generally consist of any of 1 to K streams.

The ANIC 240 and the collaborated software and firmware protocol stack 215 225 offer a very low loss-ratio because packet loss at this stage is very expensive. The loss ratio achieved within the RDMA stack is as low as one of 68 billion.

Each receiver 246 of the array of K receivers 246 in the select receiver 245 can each handle a full line-speed incoming packet of its own single port 214, in a lossless manner. Then, the selection and buffer logic 247 manages the address table, and passes packets to upper layers but drops any packets not selected for forwarding.

The proposed asymmetric switch and interface controller enhances both incast and multicast traffic. For incast traffic, the asymmetric interface controller can take up to K incoming streams simultaneously. That is K times more powerful than commercially popular one port receivers.

For multicast traffic, the asymmetric switch will copy and deliver the multicast packet to all addressed interface controllers, and the interface controllers will deliver the packet to applications and/or data. Since K<<N, loss is still inevitable but is managed to occur prior to the last stage. Since there is no congestion after the copy function, as soon as the packet-copy begins, the architecture is capable of supporting extremely low loss ratios, e.g. one of 10 billion.

In some embodiments, network infrastructure includes asymmetric network interface controllers ANICs 240 each of which is connected to a DBSS 120 similar to that of FIG. 1, via K connections. In some embodiments, the asymmetric network interface controller (ANIC) 240 is coupled to one or more known switches which have been configured to provide the ANIC 240 with multiple simultaneous connections over its K input ports 214. In some embodiments, the network infrastructure includes ANICs 240 but does not include any DBSS 120 similar to that of FIG. 1. In some embodiments, the network infrastructure includes the ANIC 240 in a computing node, storage equipment, or other network node or network equipment. In some embodiments the number of transmitters 249 is greater than one but less than the number K of receive ports 214.

Figure 3:
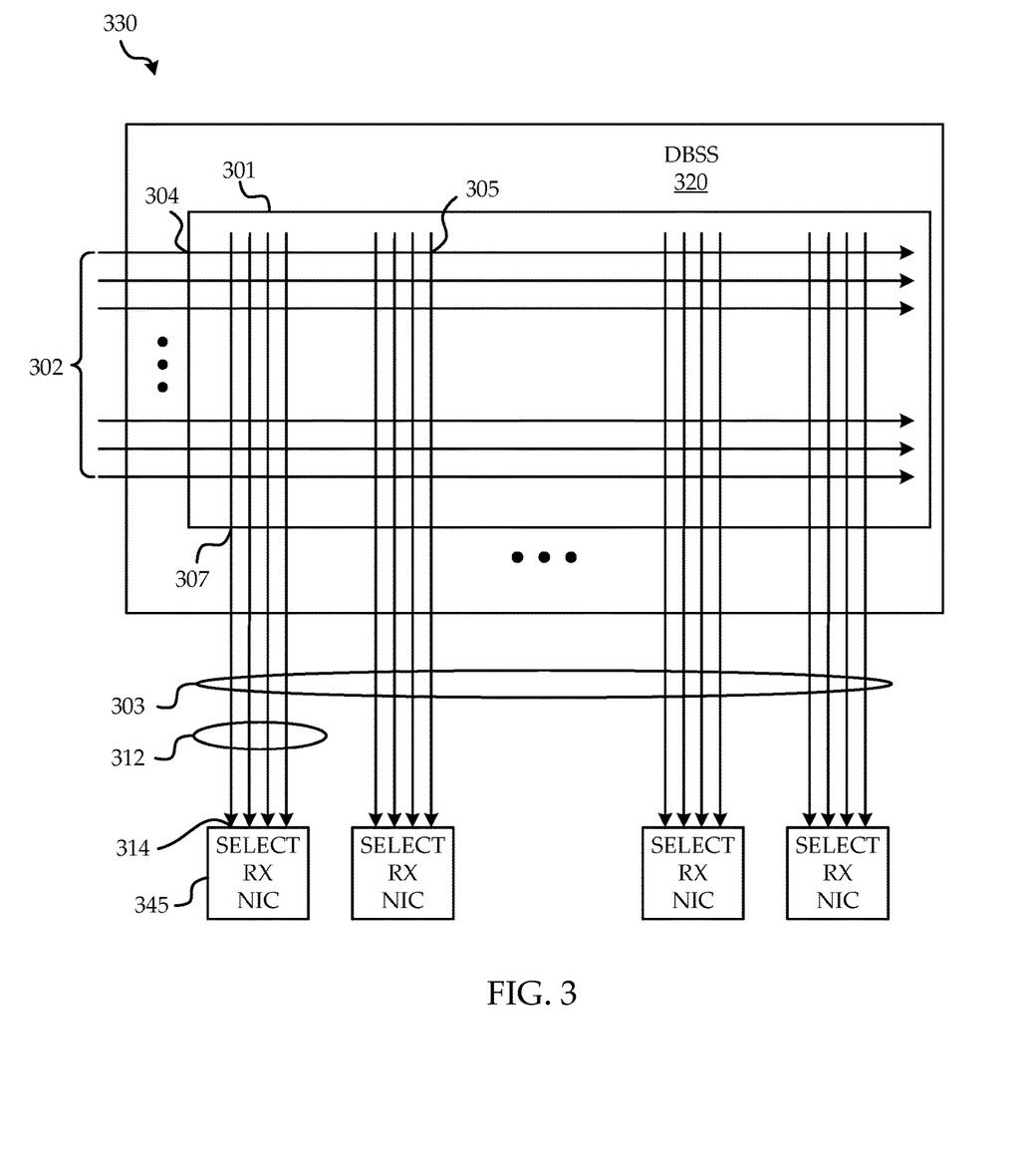
FIG. 3 is a schematic block diagram of network infrastructure including a combination of a DBSS of FIG. 1 and an ANIC of FIG. 2 according to an embodiment.

With reference to FIG. 3, network infrastructure 330 including a combination of a DBSS similar to that of FIG. 1 and an ANIC similar to that of FIG. 2 according to an embodiment, will now be discussed.

The network infrastructure 330 includes a combination of a DBSS 320 such as that of FIG. 1 specifically having N inputs 304 and N×K outputs 307 destined for N select receivers (Select RX NIC) 345, each having K input ports 314.

The DBSS 320, is comprised of an asymmetric crossbar switch 301 having ingress ports or inputs 304 for receiving ingress or input signals 302 and egress ports or outputs 307 for transmitting egress or output signals 303. The DBSS 320 includes a switching fabric with cross-points 305 for switching ingress signals 302 to the output ports 307. The cross-points 305 of the switching fabric of the crossbar switch 301 may be implemented with any structure capable of forwarding data toward the next egress lines and toward the egress ports such as the cross-point described in association with FIGS. 1 and 11. Although not shown, the asymmetric crossbar switch 301 is controlled by a controller of the DBSS 320 which uses packet addressing, for example, MAC addresses, to configure which of the inputs 304, is switched to which of the outputs 307 for incoming packets.

The asymmetric crossbar switch 301 and the DBSS 320 are asymmetric, specifically, the number N×K of outputs 307 exceeds the number N of inputs 304. Each input 304 and output 307 has the same network traffic capacity and hence, since each output 307 at any one time is switched from one of the inputs 304, each input 304 may be switched to one or more of the outputs 307 at any one time. It is also noted that the inputs 304 and outputs 307 are generic and data agnostic, i.e. any of the inputs 304 may be switched to any of the outputs 307.

In the embodiment shown, N transmitters (not shown) connected to the inputs 302 of the DBSS 320 have a corresponding N select receivers 345 connected to the N×K outputs 307 of the DBSS 320, each of the N select receivers 345 having K receiving ports 314 for receiving K output connections 312 each. A group of K output connections 312 from the outputs 307 of the asymmetric crossbar switch 301 is shown in FIG. 3. Each group of K output connections 312, in this embodiment is destined for one asymmetric network interface controller (ANIC not shown) which includes a select receiver 345 receiving each signal 312 at one of its K input ports 314.

Each output 303 of the crossbar switch is connected to one of N incoming connections 302. The crossbar switch has N×(N×K) (i.e. $N^2K$) cross-points 305.

In this embodiment, with N inputs, all of the outputs (K) of each group of N groups of outputs are connected to the same ANIC.

Synergize With Multi-Stage Network

Generally, the proposed asymmetric switch and interface controller can be used in any arbitrary network topology, including popular multi-stage networks, e.g. FatTree in current Datacenters and torus. Datacenters could deploy only Asymmetric Network Interface Controllers (ANICs), or both asymmetric switches and ANICs to improve their performance with respect to incast and multicast.

Figure 4:
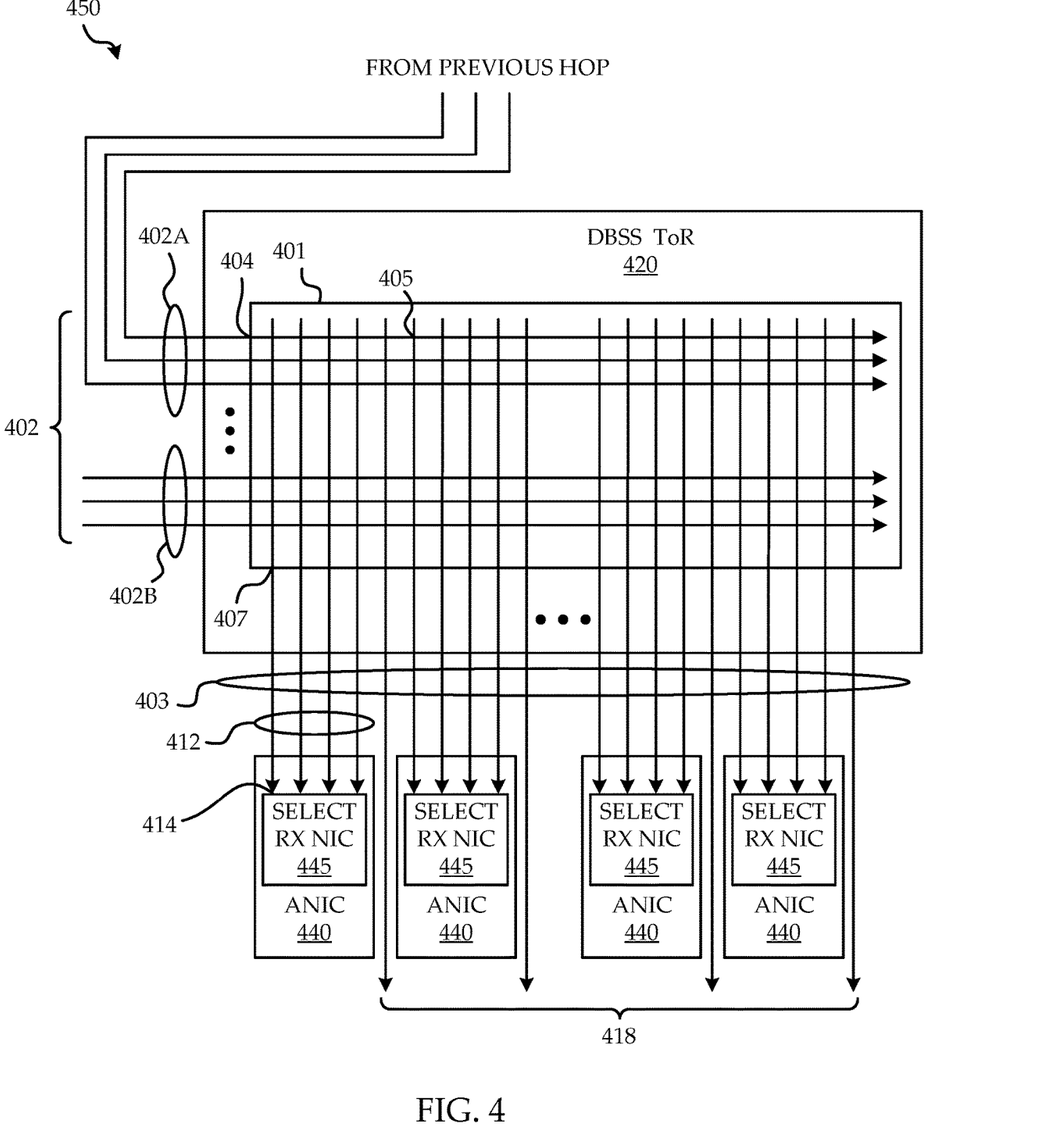
FIG. 4 is a schematic block diagram of a variation of a combination of a DBSS of FIG. 1 implemented as an asymmetric (ToR) switch and servers including the ANIC of FIG. 2.
Figure 5:
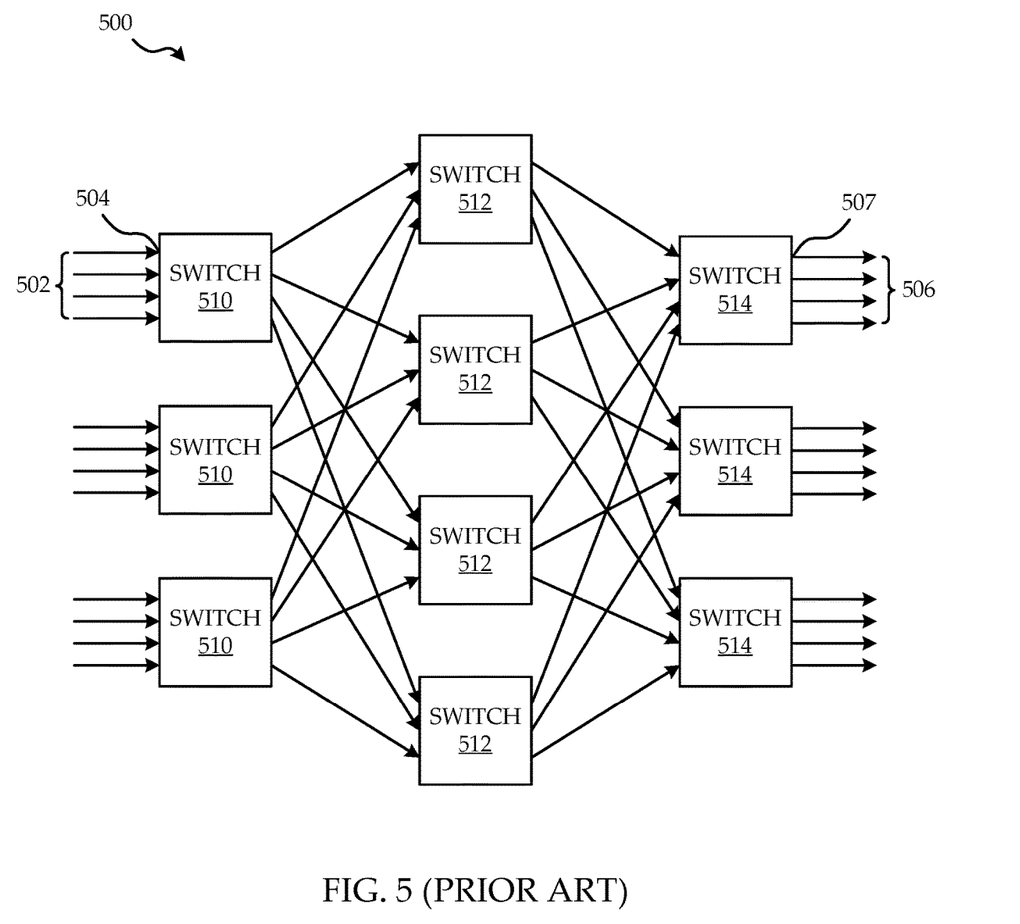
FIG. 5 is a schematic block diagram of a prior art Clos network.
Figure 6:
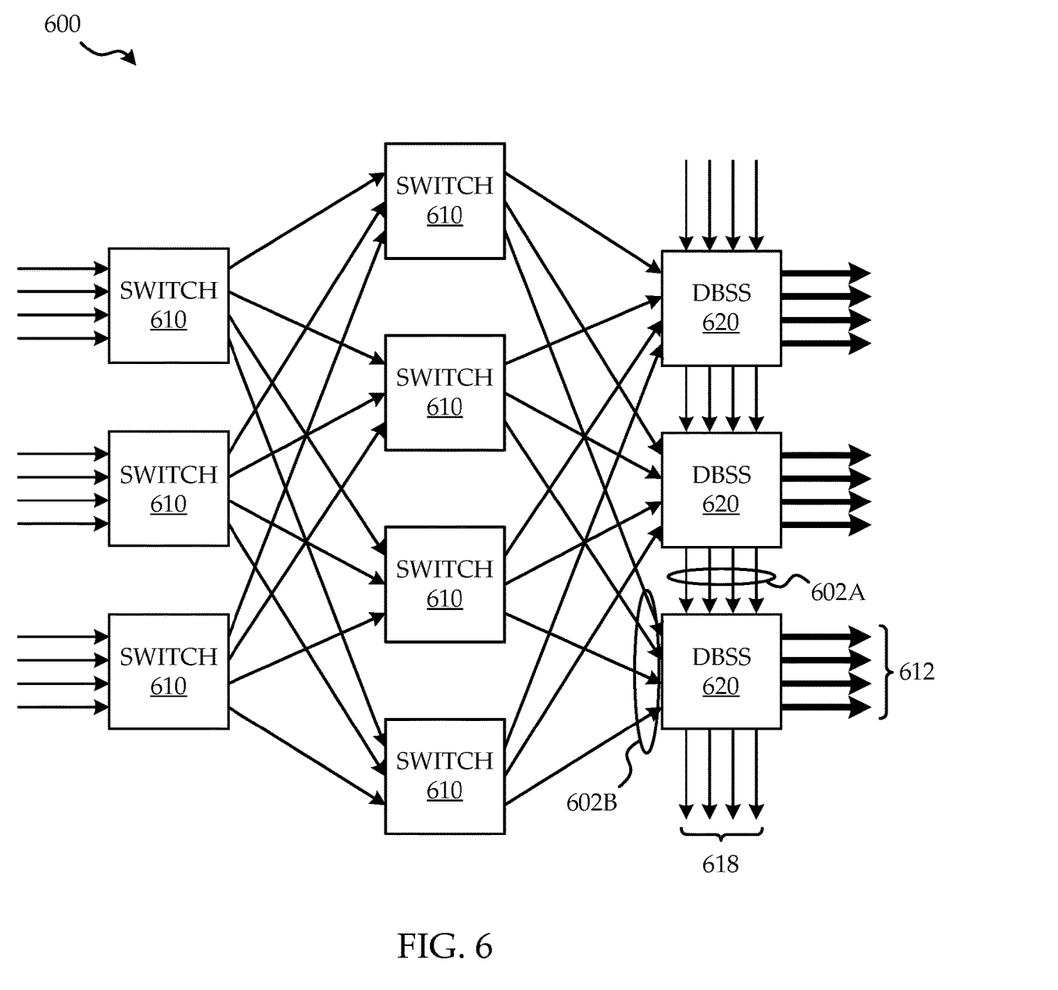
FIG. 6 is a schematic block of a three stage Clos network with the DBSS as ToR switch of FIG. 4 as the last stage.

With reference to FIGS. 4, 5, and 6, a DBSS ToR switch 420 working in tandem with Asymmetric Network Interface Controllers (ANICs) 440 as a last stage of an asymmetric Clos network 600 will now be discussed. In data centers, the Clos network is well known (also referred to as a FatTree), and the last stage is well-known as a ToR (Top of Rack) switch.

A popular three-stage Clos network 500 is shown in FIG. 5. Each of the switches 510, 512, 514 in the network infrastructure of the Clos network 500 has an input capacity which is the same as its output capacity and since the capacity of each input is the same as each output, the Clos network 500 has the same number of inputs 504 as outputs 507 and the same number of input connections 502 as output connections 506. The total number of outputs or inputs each switch possesses depends upon the network topology. In the example shown in FIG. 5, there are fewer switches 510, 514 at the base and the top of the tree than there are switches 512 in the middle of the tree, and hence the switches 510, 514 at the base and the top of the tree each have more inputs and outputs than the number of inputs and outputs possessed by each switch 512 in the middle of the tree.

With reference to FIG. 4, a network infrastructure 450 variation of a combination of a DBSS similar to that of FIG. 1 implemented as an asymmetric (ToR) switch (DBSS ToR 420) and servers including the ANIC 440 similar to that of FIG. 2, will now be discussed.

The network infrastructure 450 includes a combination of a DBSS ToR 420 specifically having 2N inputs 404 and N×(K+1) outputs 407, N×K of which are destined for N select receivers (Select RX NIC) 445, each having K input ports 414, and the remaining N outputs 407 generating N output signals 418 for the next hop (another DBSS ToR 420).

The DBSS ToR 420, primarily is comprised of an asymmetric crossbar switch 401 having ingress ports or inputs 404 for receiving ingress or input signals 402 and egress ports or outputs 407 for transmitting egress or output signals 403. The DBSS ToR 420 includes a switching fabric with cross-points 405 for switching ingress signals 402 to the output ports 407. In the embodiment depicted in FIG. 4, half of the ingress signals 402 are from a previous hop 402A (another DBSS ToR 420) while the other half of the ingress signals 402B are from the adjacent layer of the Clos network. In this embodiment, there are a total of 2N ingress signals 402, N from a previous hop 402A and N from the adjacent level in the Clos network 402B.

The cross-points 405 of the switching fabric of the crossbar switch 401 may be implemented with any structure capable of forwarding data toward the next egress lines and toward the egress ports such as the cross-point described in association with FIGS. 1 and 11. Although not shown, the asymmetric crossbar switch 401 is controlled by a controller of the DBSS ToR 420 which uses packet addressing, for example, MAC addresses, to configure which of the inputs 404, is switched to which of the outputs 407 for incoming packets.

The asymmetric crossbar switch 401 and the DBSS ToR 420 are asymmetric, specifically, the number N×(K+1) (K≥2) of outputs 407 exceeds the number 2N of inputs 404. Each input 404 and output 407 has the same network traffic capacity and hence, since each output 407 at any one time is switched from one of the inputs 404, each input 404 may be switched to one or more of the outputs 407 at any one time. It is also noted that the inputs 404 and outputs 407 are generic and data agnostic, i.e. any of the inputs 404 may be switched to any of the outputs 407.

In the embodiment shown, 2N transmitters (not shown) connected to the 2N inputs 402 of the DBSS ToR 420 have a corresponding N select receivers 445 connected to the N×K outputs 407 of the DBSS ToR 420, each of the N select receivers 445 having K receiving ports 414 for receiving K output connections 412 each. A group of K output connections 412 from the outputs 407 of the asymmetric crossbar switch 401 is shown in FIG. 4. Each group of K output connections 412, in this embodiment, is destined for one asymmetric network interface controller (ANIC) 440 which includes a select receiver 445 receiving each signal 412 at one of its K input ports 414. In some embodiments each ANIC 440 is housed in a server (not shown) which is connected to the DBSS ToR 420 via a group of K outputs 412.

The remaining N output connections 418 are destined for the next hop, i.e. the next DBSS ToR 420.

Each output 403 of the asymmetric crossbar switch 401 is connected to one of 2N incoming connections 402. The crossbar switch has 2N×(N×(K+1)) cross-points 405. In this embodiment, with 2N inputs, only a subset (K) of all the outputs (K+1) of each group of N groups of outputs are connected to the same ANIC 440.

The architecture of the DBSS ToR 420 utilized in the last stage, as illustrated in FIG. 4 is similar the DBSS 120 illustrated in FIG. 1. Indeed, this is just a specific deployment of the generic architecture of FIG. 1. In other embodiments, notable differences of next-hop traffic demand different K and N from that shown specifically in FIG. 4.

A Clos network 600 including multiple DBSS ToR switches 620 similar to the DBSS ToR 420 of FIG. 4 is shown in FIG. 6. As described in connection with FIG. 4, the DBSS ToR 620 has 2N inputs where half (N) of these inputs 602B are from the adjacent layer of the other switches 610 in the Clos network, and the other half (N) of these inputs 602A are from the previous hop i.e. a previous DBSS ToR 620. As discussed in connection with FIG. 4, N outputs 618 proceed to the next hop (another DBSS ToR 620 not shown) while N×K outputs 612 are output and destined for N ANICs (not shown). In FIG. 6, each bold arrow (of the set of N) in the outputs 612 represents K output signals.

DBSS and ANIC in Direct Interconnection Network

Figure 7:
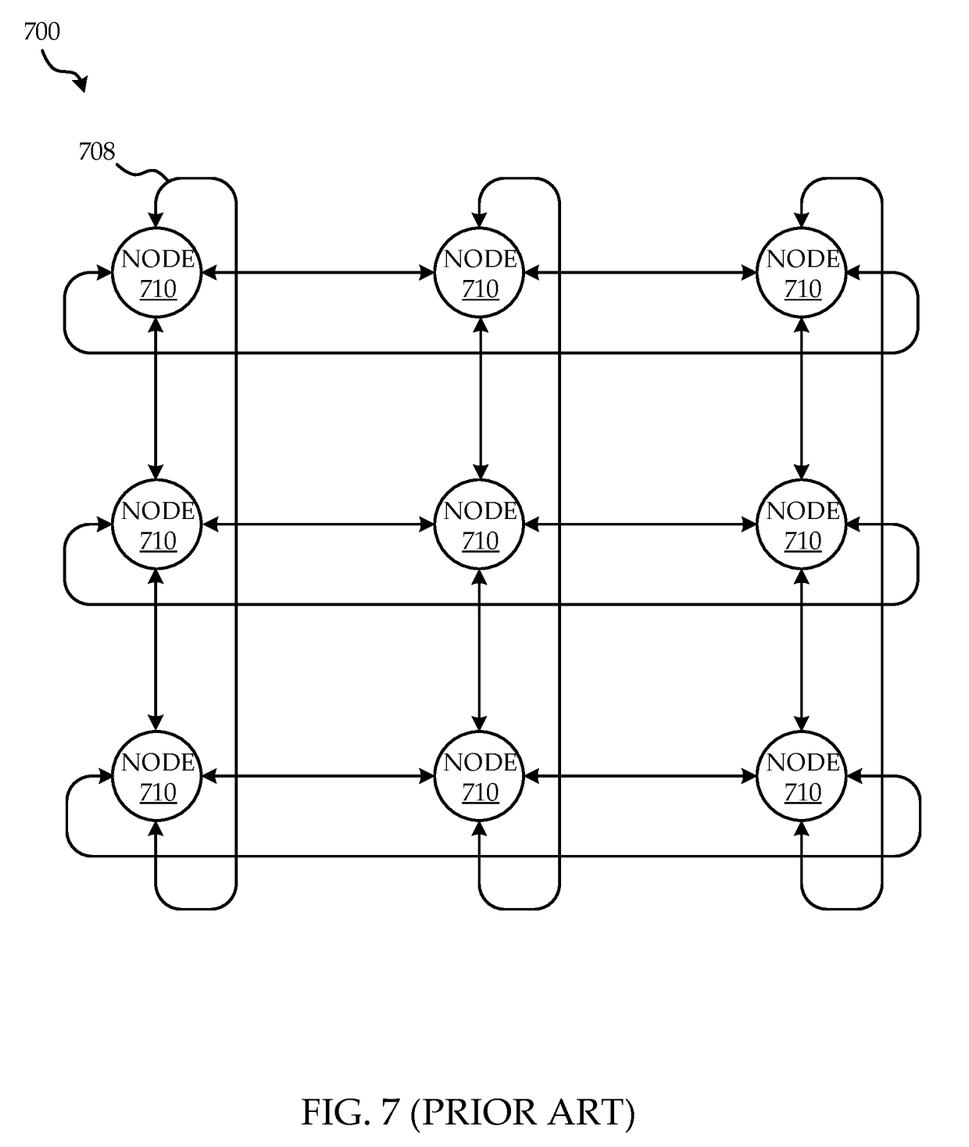
FIG. 7 is a schematic block diagram of a prior art 2D torus direct-interconnection network.

Direct Interconnection Networks were introduced before the switch and is still popularly used in High-Performance Computing and other cluster network based applications. The multi-dimensional approach to network scaling and its routing and control are well studied in Direct Interconnection Networks such as Torus, Hypercube, and B-Cube. A well-known 2D torus direct-interconnection network 700 is illustrated in FIG. 7, in which nodes 710 are directly connected by connections 708 in a square mesh of two dimensions, each dimension looping back on itself, forming the topology of a 2D torus.

It should be noted that the connections in this known network do not have any logic functionality. Switching and other logic functions are distributed into the computing-storage-switch nodes 710.

Figure 8:
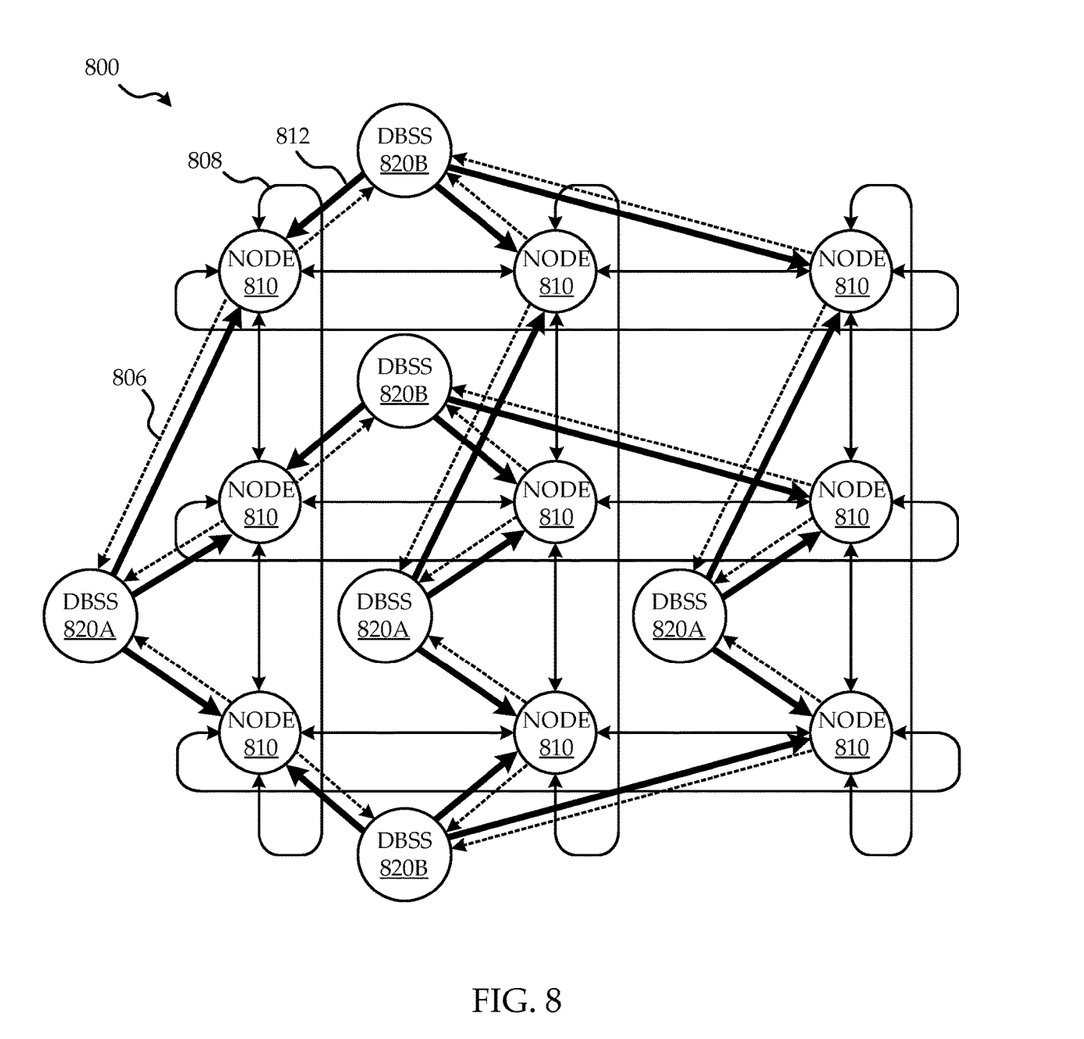
FIG. 8 is a schematic block diagram of a hybrid DBSS augmented 2D torus direct-interconnection network.

With reference to FIG. 8, a hybrid DBSS augmented 2D torus direct-interconnection network 800 will now be discussed. The direct interconnected 2D torus of known networks is retained, and nodes 810 are directly connected by connections 808 in a standard manner to form a 2D torus direct-interconnection network.

Augmenting this network infrastructure are first DBSSs 820B, each first DBSS 820B connected to all nodes 810 of a corresponding "row" of the mesh defining the torus and second DBSSs 820A, each second DBSS 820A connected to all nodes of a corresponding "column" of the mesh defining the torus. Each DBSS 820A 820B acts as a hub connected to all nodes 810 of a corresponding orthogonal "slice" of the mesh defined by the dimensions of the torus.

Each connection between the DBSS 820A 820B and a node 810 includes output signals 812 from the DBSS 820A 820B to the node 810 and input signals 806 to the DBSS 820A 820B from the node 810. In some embodiments, the total number of output signals 812 per connection is greater than the total number of input signals 806 per connection. In some embodiments, the number of input signals 806 to any DBSS 820A 820B from nodes it is connected to is N, and the total number of output signals 812 to nodes it is connected to is N×K.

Each node 810 in the embodiment of FIG. 8 includes an ANIC (not shown) for every DBSS 820A 820B it is connected to, each ANIC receiving the K output signals 812 of that connection.

As can be extrapolated from FIG. 8, augmenting the direct-interconnection network with DBSSs 820A 820B can reduce the longest hop-count, or network diameter, as well as latency depending upon the overall size of the network and its topology. For instance, in a 2D Mesh/Torus of 12×12=144 nodes, the longest hop-count is 2 vs. 22 (11+11). That could lead to better latency by a factor of at least 10× and possibly much more, the bigger the cluster, the better the latency advantage.

Deployment into the Existing Network

Figure 9:
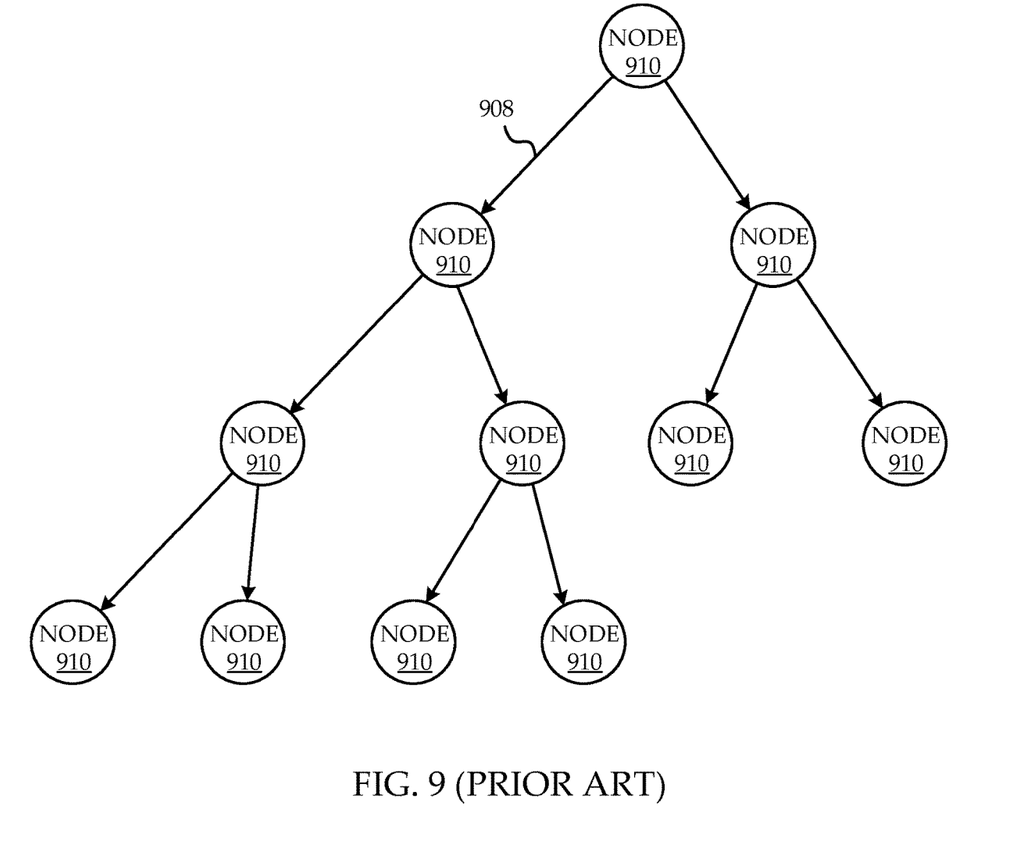
FIG. 9 is a schematic block diagram illustrating prior art multicast through a network.
Figure 10:
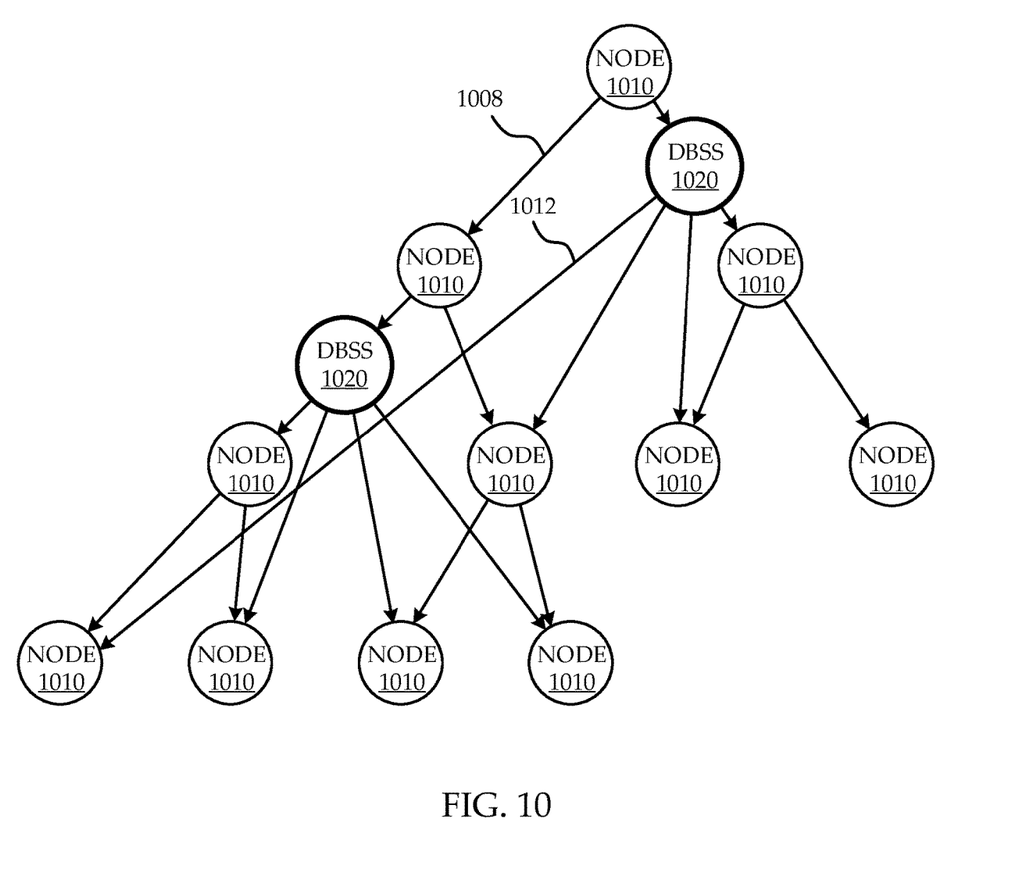
FIG. 10 is a schematic block diagram illustrating multicast through the same network enhanced by DBSSs added into the network of FIG. 9.

Without limiting consideration to any specific network topology, multicast in the network can be described as a 1:N tree, as shown in FIG. 9 with multicast connections 908 connecting nodes 910. FIG. 10 illustrates multicast through the same network enhanced by DBSSs 1020 added into the multicast tree arbitrarily to enhance the multicast function, by helping to reduce the depth of the tree, which in turn reduces the overall load and latency of the entire multicast process.

Some multicast connections 1008 are replaced by DBSSs 1020 as hyperedges, each of which multicast 1012 to some nodes further down the tree to reduce the tree's depth through the DBSS 1020. The asymmetric nature of the DBSS 1020 enable it to switch to more output connections than the number of its inputs. In some embodiments the nodes 1010 include ANICs, while in other embodiments, they do not.

In one embodiment, the DBSS is deployed using a Spine-Leaf-ToR network topology commonly used in datacenters. In this case, the DBSS is added either within a rack or in-between racks to enhance multicast. In this deployment method, an asymmetric interface controller (or extra interface controller) is provided on the receiving side of the servers.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A system for a communication infrastructure in a network, the system comprising:
    an asymmetric crossbar switch including a crossbar switch fabric having N ingress ports and M egress ports, and N×M cross-points, each egress and ingress port having the same capacity, N being less than M, and the asymmetric crossbar switch configured to controllably switch to any egress port a signal arriving at any one ingress port; and
    at least one select receiver, each select receiver coupled to K egress ports of the M egress ports,
wherein the asymmetric crossbar switch is comprised in a distributed broadcast select switch (DBSS) controlling the asymmetric crossbar switch to switch signals received over the ingress ports to the egress ports with use of packet addresses in said signals, wherein the network comprises a Clos network, wherein M is equal to (N/2)×(K+1), wherein the DBSS is implemented as a last stage top of rack switch of the Clos network, and wherein a first N/2 of the N ingress ports are coupled to an adjacent level of the Clos network to the DBSS, a second N/2 of the N ingress ports are coupled to a previous hop DBSS, and N/2 egress ports of the DBSS are coupled to a next hop DBSS.

2. The system of claim 1, wherein the N ingress ports of the DBSS are coupled to N transmitters and (N/2)×K of the M egress ports of the DBSS are coupled to the at least one select receiver, the at least one select receiver consisting of N/2 select receivers, and K being less than N.

3. The system of claim 2, wherein each select receiver is comprised in a corresponding asymmetric network interface controller (ANIC) comprising K input ports and at least one output port, the number of output ports less than K.

4. The system of claim 3 wherein each ANIC comprises a selection and buffer logic for buffering and selecting packets received by the corresponding select receiver, wherein each select receiver includes K receivers each including one of said K input ports.

5. The system of claim 2, wherein the network comprises a cluster network.

6. The system of claim 5, wherein the cluster network is a direct interconnection cluster network.

7. The system of claim 1, wherein each select receiver is comprised in an asymmetric network interface controller (ANIC) comprising at least one transmitter, the select receiver including K receivers, each receiver having an input port and each transmitter having an output port, each input and output port having the same capacity, the number of transmitters less than K.

8. The system of claim 7, wherein each ANIC comprises a selection and buffer logic for buffering and selecting packets received by the K receivers of the select receiver.

9. The system of claim 8, wherein the input ports of each ANIC are coupled to K egress ports of the asymmetric crossbar switch.

10. The system of claim 9, wherein each ANIC is comprised in storage equipment of a datacenter network.

* * * * *